US012518325B2

(12) United States Patent
Kato et al.

(10) Patent No.: US 12,518,325 B2
(45) Date of Patent: Jan. 6, 2026

(54) ELECTRIC POWER SYSTEM PLANNING OPERATION DEVICE, METHOD, AND SYSTEM

(71) Applicant: Hitachi, Ltd., Tokyo (JP)

(72) Inventors: Daichi Kato, Tokyo (JP); Yohei Murakami, Tokyo (JP); Takahisa Matsuzaki, Tokyo (JP); Masahiro Watanabe, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 699 days.

(21) Appl. No.: 17/744,992

(22) Filed: May 16, 2022

(65) Prior Publication Data

US 2022/0383431 A1    Dec. 1, 2022

(30) Foreign Application Priority Data

May 27, 2021    (JP) .................................. 2021-089223

(51) Int. Cl.
*G06Q 50/06*    (2024.01)
*G06Q 50/26*    (2024.01)
*H02J 3/28*    (2006.01)

(52) U.S. Cl.
CPC ............. *G06Q 50/06* (2013.01); *G06Q 50/26* (2013.01); *H02J 3/28* (2013.01); *H02J 2203/20* (2020.01)

(58) Field of Classification Search
CPC ........ G06Q 50/06; G06Q 50/26; G06Q 10/06; H02J 3/28; H02J 2203/20; H02J 3/001; Y04S 10/50
See application file for complete search history.

(56) References Cited

U.S. PATENT DOCUMENTS 11,748,834 B1 * 9/2023 Miller ................ G06Q 10/0635
                                                705/7.15
2011/0022879 A1 * 1/2011 Chavda ............... G06F 11/0793
                                                714/1
(Continued)

FOREIGN PATENT DOCUMENTS

JP        2014-187743 A     10/2014

OTHER PUBLICATIONS

Karagiannis, Georgios Marios, et al. "Power grid recovery after natural hazard impact." Joint Research Center: European Union (2017). (Year: 2017).*

(Continued)

*Primary Examiner* — Thomas C Lee
*Assistant Examiner* — Tyler Dean Hedrick
(74) *Attorney, Agent, or Firm* — Crowell & Moring LLP

(57) ABSTRACT

An electric power system planning operation device against occurrence of a disaster includes: a disaster information selection unit that selects disaster information data of a disaster type to be handled; a disaster countermeasure candidate calculation unit that calculates a disaster countermeasure candidate, system maintenance countermeasure candidate data, and system operation countermeasure candidate data; a reliability economic efficiency index value calculation unit that calculates a reliability economic efficiency index value for the disaster countermeasure candidate calculation result, system data that is information about the configuration of an electric power system, damage cost data that is information about the amount of damage at the time of an assumed disaster type, and reliability economic efficiency index data that is information indexing a relation between reliability and economic efficiency; and a disaster countermeasure decision unit that decides a disaster coun- (Continued)

termeasure by using the reliability economic efficiency index value data.

21 Claims, 16 Drawing Sheets

(56) References Cited

U.S. PATENT DOCUMENTS

| | | |
|---|---|---|
| 2020/0092334 A1* | 3/2020 | Hiebert .............. H04L 41/0816 |
| 2020/0153274 A1 | 5/2020 | Münz et al. |
| 2023/0033317 A1* | 2/2023 | Lin .................... H04L 63/1433 |
| 2024/0005435 A1* | 1/2024 | Pon ..................... G06Q 10/087 |

OTHER PUBLICATIONS

United Kingdom Search Report issued in United Kingdom Application No. 2207056.9 dated Mar. 27, 2023 (nine (9) pages).

* cited by examiner

FIG.5

EARTHQUAKE — D311A

| EARTHQUAKE CASE | SEISMIC CENTER | SEISMIC INTENSITY | DAMAGED FACILITY | DAMAGE CONTENT | OCCURRENCE PROBABILITY |
|---|---|---|---|---|---|
| CE1 | POINT A | 7 | POWER PLANT G10 | FALLING | 0.00011 |
| | | | POWER PLANT G20 | FALLING | 0.00005 |
| | | | TRANSMISSION LINE L10 | SHUT-OFF | 0.00008 |
| ⋮ | ⋮ | ⋮ | ⋮ | ⋮ | ⋮ |
| CE2 | POINT B | UPPER 6 | POWER PLANT G11 | FALLING | 0.00003 |
| | | | TRANSMISSION LINE L11 | SHUT-OFF | 0.00015 |
| | | | TRANSMISSION LINE L12 | SHUT-OFF | 0.00001 |
| ⋮ | ⋮ | ⋮ | ⋮ | ⋮ | ⋮ |

DB31 (D31)

TYPHOON CASE CT2

TYPHOON CASE CT1 — D311B

| DATE AND TIME | CENTRAL POSITION | CENTRAL ATMOSPHERIC PRESSURE (hPa) | MAXIMUM WIND SPEED (m/s) | STORM ZONE RADIUS (km) | STRONG WIND ZONE RADIUS (km) | DAMAGED FACILITY | DAMAGE CONTENT | OCCURRENCE PROBABILITY |
|---|---|---|---|---|---|---|---|---|
| YYYY/MM/DD 18:00 | N1, E1 | 1000 | 30 | 50 | 300 | NONE | NONE | NONE |
| YYYY/MM/DD 21:00 | N2, E2 | 950 | 40 | 70 | 400 | TRANSMISSION LINE L21 | SHUT-OFF | 0.05 |
| YYYY/MM/DD 21:00 | N3, E3 | 900 | 50 | 90 | 400 | TRANSMISSION LINE L21 | SHUT-OFF | 0.2 |
| ⋮ | ⋮ | ⋮ | ⋮ | ⋮ | ⋮ | ⋮ | ⋮ | ⋮ |

FIG. 6

TRANSMISSION LINE  
D321A

| TRANSMISSION LINE EXTENSION CASE | TRANSMISSION LINE | NUMBER OF LINES | SUBSTATION | | COST (100 MILLION YEN) |
|---|---|---|---|---|---|
| | | | TRANSMISSION END | RECEPTION END | |
| CL1 | TRANSMISSION LINE L1 | 1 | S1 | S2 | 1000 |
| CL2 | TRANSMISSION LINE L2 | 2 | S2 | S3 | 500 |
| ⋮ | ⋮ | ⋮ | ⋮ | ⋮ | ⋮ |

D322A, D323A, D324A, D325A, D326A

SUBSTATION  
D321B

| SUBSTATION EXTENSION CASE | SUBSTATION | NUMBER OF BANKS | COST (100 MILLION YEN) |
|---|---|---|---|
| CS1 | SUBSTATION S1 | 2 | 100 |
| CS2 | SUBSTATION S2 | 4 | 200 |
| ⋮ | ⋮ | ⋮ | ⋮ |

D322B, D323B, D324B, D325B

PHASE MODIFYING FACILITY  
D321C

| PHASE MODIFYING FACILITY EXTENSION CASE | PHASE MODIFYING FACILITY | NUMBER | SUBSTATION | COST (100 MILLION YEN) |
|---|---|---|---|---|
| CY1 | PHASE MODIFYING Y1 | 1 | S1 | 0.05 |
| CY2 | PHASE MODIFYING Y2 | 2 | S2 | 0.1 |
| ⋮ | ⋮ | ⋮ | ⋮ | ⋮ |

| POWER PLANT | DATE YYYY/MM/DD TIME 00:30 |
| --- | --- |

| POWER PLANT D331 | DATE YYYY/MM/DD TIME 00:00 D332 |
| --- | --- |

| POWER PLANT D333 | OUTPUT (MW) D334 | | | COST (YEN/kWh) D335 | |
| --- | --- | --- | --- | --- | --- |
| | CURRENT VALUE | UPPER LIMIT | LOWER LIMIT | INCREASE | DECREASE |
| POWER PLANT G1 | 500 | 1000 | 300 | 6 | -6 |
| POWER PLANT G2 | 300 | 500 | 150 | 10 | -10 |
| ⋮ | ⋮ | ⋮ | ⋮ | ⋮ | ⋮ |

| SUBSTATION D351 | COST (YEN/kWh) D352 |
| --- | --- |
| SUBSTATION S1 | 4000 |
| SUBSTATION S2 | 2000 |
| ⋮ | ⋮ |

| TYPE D361 | WEIGHT D362 |
| --- | --- |
| COUNTERMEASURE COST (YEN) | 1 |
| DAMAGE COST EXPECTATION VALUE (YEN) | 1000 |

FIG.10

DISASTER COUNTERMEASURE CASE CC1 ~ D421

SYSTEM MAINTENANCE COUNTERMEASURE ~ D421A

| TRANSMISSION LINE EXTENSION CASE ~D422A | SUBSTATION EXTENSION CASE ~D423A | PHASE MODIFYING FACILITY EXTENSION CASE ~D424A |
|---|---|---|
| NONE | NONE | NONE |

SYSTEM OPERATION COUNTERMEASURE ~ D421B

POWER PLANT    DATE YYYY/MM/DD TIME 00:30

POWER PLANT    DATE YYYY/MM/DD TIME 00:00

| POWER PLANT ~D422B | OUTPUT (MW) | | | |
|---|---|---|---|---|
| | BEFORE CHANGE ~D424B | UPPER LIMIT | LOWER LIMIT ~D423B | AFTER CHANGE ~D425B |
| POWER PLANT G1 | 500 | 1000 | 300 | 1000 |
| POWER PLANT G2 | 300 | 500 | 150 | 150 |
| ⋮ | ⋮ | ⋮ | ⋮ | ⋮ |

DB42 (D42)

DISASTER COUNTERMEASURE CASE CC2

SYSTEM MAINTENANCE COUNTERMEASURE

| TRANSMISSION LINE EXTENSION CASE | SUBSTATION EXTENSION CASE | PHASE MODIFYING FACILITY EXTENSION CASE |
|---|---|---|
| CL1 | CS1 | NONE |

SYSTEM OPERATION COUNTERMEASURE

POWER PLANT    DATE YYYY/MM/DD TIME 00:30

POWER PLANT    DATE YYYY/MM/DD TIME 00:00

| POWER PLANT | OUTPUT (MW) | | | |
|---|---|---|---|---|
| | CURRENT VALUE | UPPER LIMIT | LOWER LIMIT | AFTER CHANGE |
| POWER PLANT G1 | 500 | 1000 | 300 | 500 |
| POWER PLANT G2 | 300 | 500 | 150 | 300 |
| ⋮ | ⋮ | ⋮ | ⋮ | ⋮ |

| DISASTER CASE | DISASTER COUNTERMEASURE CASE | COUNTERMEASURE COST (100 MILLION YEN/YEAR) | DAMAGE COST EXPECTATION VALUE (100 MILLION YEN/YEAR) | INDEX VALUE |
|---|---|---|---|---|
| CE1 | NONE | 0 | 0.1 | 1000 |
| CE1 | CC1 | 50 | 0.01 | 150 |
| CE1 | CC2 | 110 | 0 | 110 |
| CT1 | NONE | 0 | 0.02 | 200 |
| CT1 | CC1 | 50 | 0 | 50 |
| CT1 | CC2 | 110 | 0 | 110 |

| DISASTER COUNTERMEASURE CASE | DISASTER CASE | INDEX VALUE | SELECTION RESULT |
|---|---|---|---|
| NONE | CE1 | 1200 | − |
| NONE | CT1 | 200 | |
| CC1 | CE1 | 150 | ✓ |
| CC1 | CT1 | 50 | |
| CC2 | CE1 | 110 | − |
| CC2 | CT1 | 110 | |

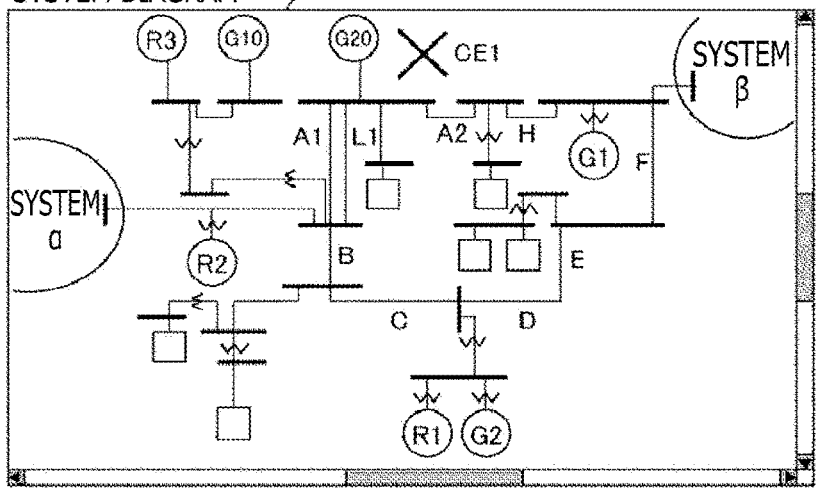

DISASTER INFORMATION

DISASTER CASE
[ CE1 ▽ ] ~53

DISASTER CONTENT ~54

| SEISMIC CENTER | SEISMIC INTENSITY | DAMAGED FACILITY | DAMAGE CONTENT | OCCURRENCE PROBABILITY |
|---|---|---|---|---|
| POINT A | 7 | POWER PLANT G10 | FALLING | 0.00011 |
| | | POWER PLANT G20 | FALLING | 0.00005 |
| | | TRANSMISSION LINE L10 | SHUT-OFF | 0.00008 |

DISASTER COUNTERMEASURE CANDIDATE

DISASTER COUNTERMEASURE CANDIDATE CASE
[ CL1 ▽ ] ~55

DISASTER COUNTERMEASURE CANDIDATE CONTENT ~56

| TRANSMISSION LINE | NUMBER OF LINES | SUBSTATION | | COST (100 MILLION YEN) |
| | | TRANSMISSION END | RECEPTION END | |
|---|---|---|---|---|
| TRANSMISSION LINE L1 | 1 | S1 | S2 | 1000 |

FIG.15

SYSTEM DIAGRAM ~51

EXPLANATORY NOTE ~52
- (G) SYNCHRONOUS MACHINE POWER SUPPLY
- (R) RENEWABLE ENERGY POWER SUPPLY
- ☐ LOAD
- ⋈ TRANSFORMER
- — BUS
- ···· TRACK
- ✕ SEISMIC CENTER

DISASTER COUNTERMEASURE CASE
CC1 ▽  ~57

SYSTEM MAINTENANCE COUNTERMEASURE ~58

| TRANSMISSION LINE EXTENSION CASE | SUBSTATION EXTENSION CASE | PHASE MODIFYING FACILITY EXTENSION CASE |
|---|---|---|
| NONE | NONE | NONE |

SYSTEM OPERATION COUNTERMEASURE ~59
DATE [YYYY/MM/DD ▽]   TIME [00:00 ▽] ~510

POWER PLANT ~511

| POWER PLANT | OUTPUT (MW) | | | |
|---|---|---|---|---|
| | BEFORE CHANGE | UPPER LIMIT | LOWER LIMIT | AFTER CHANGE |
| POWER PLANT G1 | 500 | 1000 | 300 | 1000 |
| POWER PLANT G2 | 300 | 500 | 150 | 150 |

RELIABILITY ECONOMIC EFFICIENCY INDEX VALUE CALCULATION RESULT ~512

| DISASTER CASE | DISASTER COUNTERMEASURE CASE | COUNTERMEASURE COST (100 MILLION YEN/YEAR) | DAMAGE COST EXPECTATION VALUE (100 MILLION YEN/YEAR) | INDEX VALUE |
|---|---|---|---|---|
| CE1 | NONE | 0 | 0.1 | 1000 |
| | CC1 | 50 | 0.01 | 150 |
| | CC2 | 110 | 0 | 110 |

DISASTER COUNTERMEASURE DECISION RESULT ~513

| DISASTER COUNTERMEASURE CASE | DISASTER CASE | INDEX VALUE | SELECTION RESULT |
|---|---|---|---|
| NONE | CE1 | 1200 | — |
| | CC1 | 200 | |
| CC1 | CE1 | 150 | ✓ |
| | CC1 | 50 | |

FIG. 18
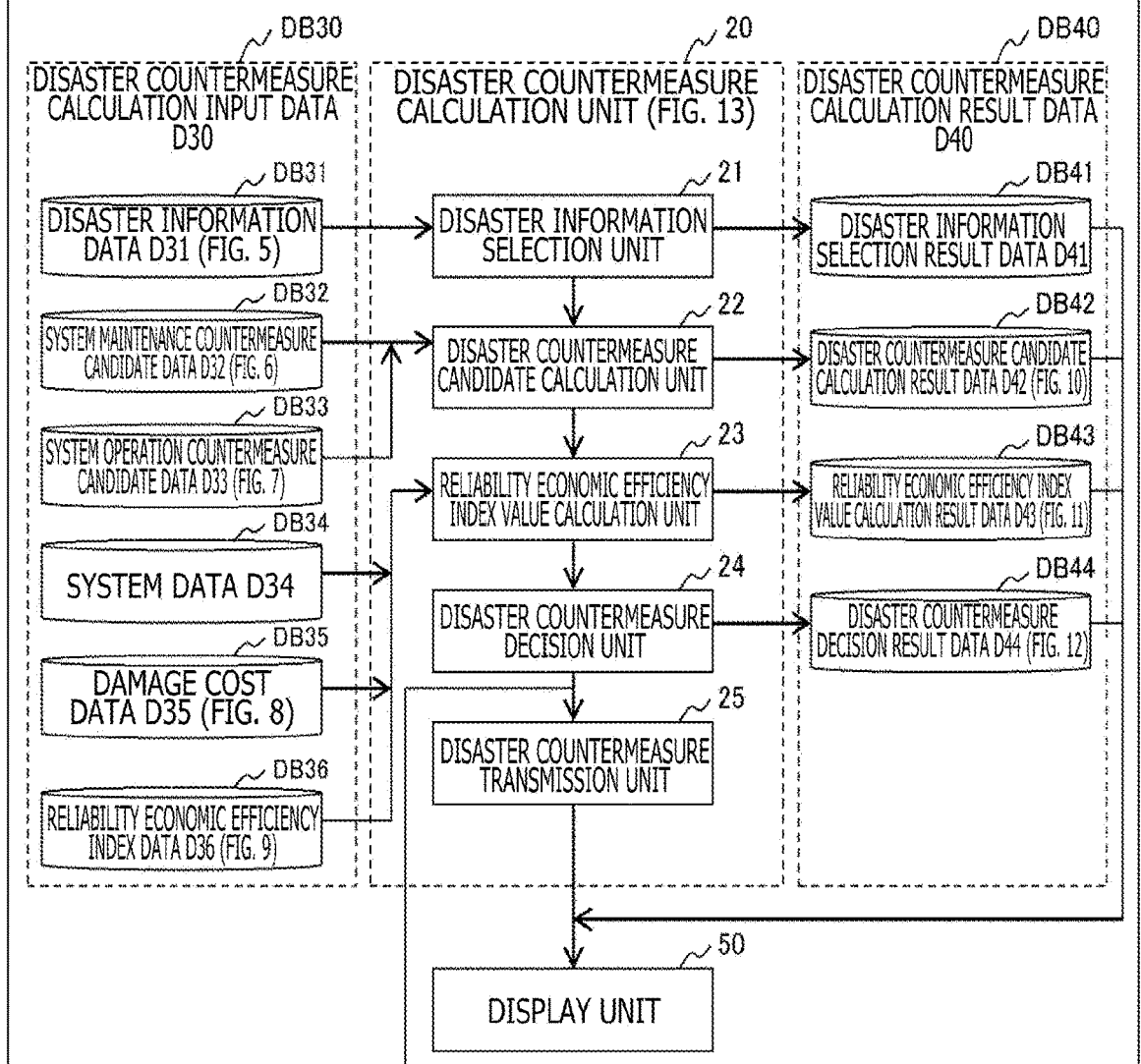
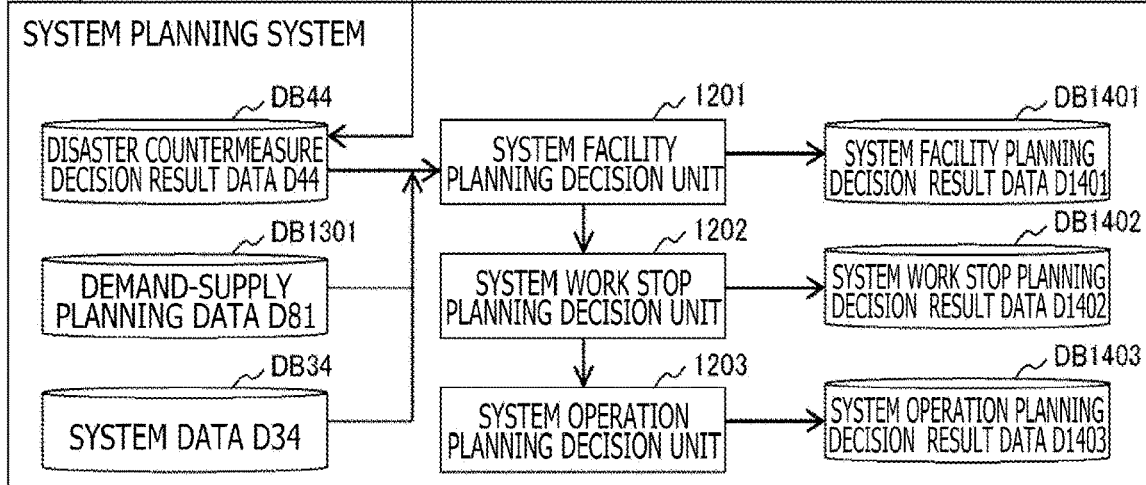

ELECTRIC POWER SYSTEM PLANNING OPERATION DEVICE, METHOD, AND SYSTEM

CLAIM OF PRIORITY

The present application claims priority from Japanese Patent application serial No. 2021-089223, filed on May 27, 2021, the content of which is hereby incorporated by reference into this application.

BACKGROUND OF THE INVENTION

1. Field of the Invention

The present invention relates to an electric power system planning operation device, a method, and a system that can reduce social costs and improve electric power resilience.

2. Description of the Related Art

An electric power system maintains system stability (synchronous stability, voltage stability, frequency stability, overload, or the like) even if a single failure occurs, and facilities are formed and operated so as not to cause a power failure. This is called an N−1 standard.

In the case where disasters such as earthquakes, typhoons, or lightning strikes occur, there is a possibility that multiple failures in which a plurality of failures are simultaneously or continuously caused occur. For the multiple failures, in the case where an increase in the social impact due to the occurrence of the failure is concerned, it is necessary to consider countermeasures to reduce the impact.

JP-2014-187743-A has been known as a background art related to countermeasures when a disaster occurs. JP-2014-187743-A describes "an electric power supply system for supplying electric power to each customer via a smart meter provided at a facility of each customer in a smart grid having a power transmission and distribution network for connecting a centralized power generation supply, a distributed power generation supply, and each customer to each other, and a network communication network for mutually connecting the centralized power generation supply, the distributed power generation supply, and each customer along the power transmission and distribution network, the system including: seismic intensity detecting means that is provided in the smart meter and detects the seismic intensity of an earthquake when the earthquake occurs; opening/closing means that is provided in the smart meter to shut off the electric power supply from the power transmission and distribution network to the facility when the seismic intensity detected by the seismic intensity detecting means is equal to or larger than a preset threshold value; and information processing means that is provided on the electric power supply side to acquire shut-off information including information of the fact that the electric power supply has been shut off by the opening/closing means and the number of times the electric power supply to the facility of each customer has been shut off and seismic intensity information of the seismic intensity detected by the seismic intensity detecting means and to acquire damage status information of the facility provided with the smart meter due to the earthquake for each district on the basis of the acquired seismic intensity information, in which the information processing means preferentially positions a district in which the number of times the electric power supply to the facility of each customer has been shut off is small to the higher ranking of cancellation of the shut-off of the electric power supply on the basis of the seismic intensity information."

In JP-2014-187743-A, in the case where the detection result of the seismic intensity of an earthquake when a disaster (earthquake) has occurred is equal to or larger than a preset threshold value, the electric power supply from the electric power system to the facility is shut off. Therefore, in the case where the technology of JP-2014-187743-A is applied as a countermeasure against multiple accidents in an electric power system, there is a problem that a damage cost associated with the shut-off (power failure) of the electric power supply always arises. In addition, the countermeasure taken in JP-2014-187743-A is only the shut-off of the electric power supply, and is not compared with other countermeasures such as extension of facilities. Extension of facilities incurs a countermeasure cost, but it is possible to reduce vulnerability to disasters by the extension. Therefore, the damage cost associated with the shut-off (power failure) of the electric power supply can be reduced. Further, by combining the countermeasure related to the facility extension with the shut-off of the electric power supply, there is a possibility that overall social costs combining the countermeasure cost with the damage cost can be reduced. In addition, the frequency of occurrence of events called infrequent large-scale disasters such as typhoons and earthquakes has increased in recent years. While such events are extremely low in the frequency of occurrence, the events have a significant impact on a wide range of facilities. Therefore, in the case where the technology of JP-2014-187743-A is applied, there is a risk that huge electric power supply is shut off and a large-scale power failure (blackout) occurs.

SUMMARY OF THE INVENTION

Accordingly, an object of the present invention is to provide an electric power system planning operation device, a method, and a system that can realize the reduction of social costs and the improvement of the resilience of an electric power system.

In order to solve the above problems, for example, the configurations described in Claims are employed. The present application includes a plurality of means for solving the above problems, and one example thereof is an electric power system planning operation device against occurrence of a disaster, the electric power system planning operation device including: a disaster information selection unit that selects disaster information data of a disaster type to be handled and uses the selected disaster information data as disaster information selection result data, from disaster information data for each disaster type; a disaster countermeasure candidate calculation unit that calculates a disaster countermeasure candidate by use of the disaster information selection result data, system maintenance countermeasure candidate data that is information about performing maintenance of a system facility in preparation for a disaster, and system operation countermeasure candidate data that is information about defining a system operation countermeasure in preparation for a disaster, the disaster countermeasure candidate calculation unit using the calculated disaster countermeasure candidate as disaster countermeasure candidate calculation result data; a reliability economic efficiency index value calculation unit that calculates a reliability economic efficiency index value for the disaster countermeasure candidate calculation result data by use of the disaster countermeasure candidate calculation result data, system data that is information about the configuration of an electric power system, damage cost data that is information about the amount of damage at the time of an assumed disaster type, and reliability economic efficiency index data that is information indexing a relation between reliability and economic efficiency, the reliability economic efficiency index value calculation unit using the calculated reliability economic efficiency index value as reliability economic efficiency index value data; and a disaster countermeasure decision unit that decides a disaster countermeasure by use of the reliability economic efficiency index value data, the disaster countermeasure decision unit using the decided disaster countermeasure as disaster countermeasure decision result data.

In addition, the present invention provides an electric power system planning operation system, in which the electric power system planning operation device is linked with any one or more of a central power feed command system, a system planning system, a system stabilization system, a basic power feed command system, a system power feed command system, and a market management system, and the disaster countermeasure decision result data obtained by the electric power system planning operation device is transmitted to the linked system.

In addition, the present invention provides an electric power system planning operation method against occurrence of a disaster, the electric power system planning operation method including: selecting disaster information data of a disaster type to be handled and using the selected disaster information data as disaster information selection result data, from disaster information data for each disaster type; calculating a disaster countermeasure candidate by use of the disaster information selection result data, system maintenance countermeasure candidate data that is information about performing maintenance of a system facility in preparation for a disaster, and system operation countermeasure candidate data that is information about defining a system operation countermeasure in preparation for a disaster, and using the calculated disaster countermeasure candidate as disaster countermeasure candidate calculation result data; calculating a reliability economic efficiency index value for the disaster countermeasure candidate calculation result by use of the disaster countermeasure candidate calculation result data, system data that is information about the configuration of an electric power system, damage cost data that is information about the amount of damage at the time of an assumed disaster type, and reliability economic efficiency index data that is information indexing a relation between reliability and economic efficiency and using the calculated reliability economic efficiency index value as reliability economic efficiency index value data; and deciding a disaster countermeasure by use of the reliability economic efficiency index value data.

According to the present invention, it is possible to realize the reduction of social costs and the improvement of the resilience of an electric power system.

BRIEF DESCRIPTION OF THE DRAWINGS

FIG. 5 is a diagram for showing an example of disaster information data stored in a disaster information database;

FIG. 6 is a diagram for showing an example of system maintenance countermeasure data stored in a system maintenance countermeasure database;

FIG. 7 is a diagram for showing an example of system maintenance countermeasure data stored in a system operation countermeasure database;

FIG. 8 is a diagram for showing an example of damage cost data stored in a damage cost database;

FIG. 9 is a diagram for showing an example of reliability economic efficiency index data stored in a reliability economic efficiency index database;

FIG. 10 is a diagram for showing an example of disaster countermeasure candidate selection result data stored in a disaster countermeasure candidate selection result database;

FIG. 11 is a diagram for showing an example of disaster countermeasure candidate selection result data stored in a reliability economic efficiency index value calculation result database;

FIG. 12 is a diagram for showing an example of disaster countermeasure decision result data stored in a disaster countermeasure decision result database;

FIG. 14 is a diagram for showing a screen display example of the electric power system planning operation device according to the first embodiment;

FIG. 15 is a diagram for showing a screen display example of the electric power system planning operation device according to the first embodiment;

FIG. 18 is a diagram for showing an entire configuration example of an electric power system planning operation device according to a third embodiment.

DESCRIPTION OF THE PREFERRED EMBODIMENTS

Hereinafter, embodiments of the present invention will be described using the drawings.

First Embodiment

Figure 1:
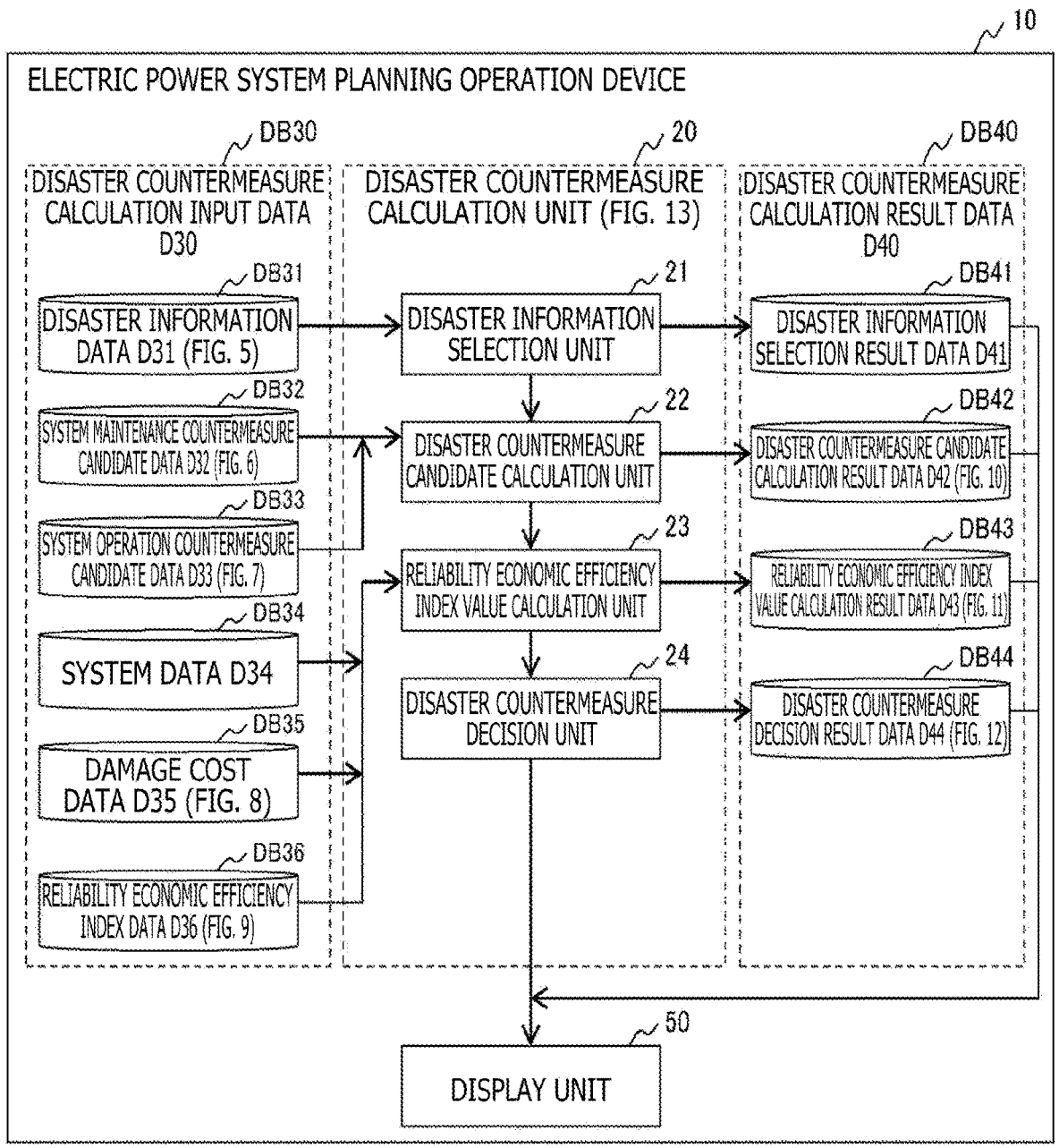
FIG. 1 is a diagram for showing an entire configuration example of an electric power system planning operation device according to a first embodiment.

FIG. 1 is a diagram for showing an entire configuration example of an electric power system planning operation device 10 according to a first embodiment. It should be noted that FIG. 1 represents the electric power system planning operation device 10 from the point of view of the functional configuration thereof.

The electric power system planning operation device 10 of FIG. 1 is configured using disaster countermeasure calculation input data DB30, a disaster countermeasure calculation unit 20, a disaster countermeasure calculation result database DB40, and a display unit 50.

The electric power system planning operation device 10 includes disaster information data D31, system maintenance countermeasure candidate data D32, system operation countermeasure candidate data D33, system data D34, damage cost data D35, and reliability economic efficiency index data D36 in the disaster countermeasure calculation input data DB30, selects disaster information in the disaster countermeasure calculation unit 20 by using these data, calculates a disaster countermeasure candidate for the selected disaster information, calculates a reliability economic efficiency index value for the calculated disaster countermeasure candidate, decides a disaster countermeasure on the basis of the calculated reliability economic efficiency index value, forms and accumulates, as the processing results thereof, disaster information selection result data D41, disaster countermeasure candidate calculation result data D42, reliability economic efficiency index value calculation result data D43, and disaster countermeasure decision result data D44 in the disaster countermeasure calculation result database DB40, and outputs and displays the data to/on the display unit 50.

The disaster countermeasure calculation input database DB30 is configured using the following databases DB31 to DB36.

The disaster information database DB31 stores the disaster information data D31 exemplified in FIG. 5 to be described later in detail.

The system maintenance countermeasure candidate database DB32 stores the system maintenance countermeasure candidate data D32 exemplified in FIG. 6 to be described later in detail.

The system operation countermeasure candidate database DB33 stores the system operation countermeasure candidate data D33 exemplified in FIG. 7 to be described later in detail.

The system database DB34 stores the system data D34. The system data D34 is stored as data about a system configuration, line impedance (R+jX), and ground electrostatic capacity (susceptance: jB), data necessary for a system configuration and state estimation (a threshold value of bad data, and the like), generator data, and other data necessary for tidal current calculation, state estimation, and time-series change calculation.

The damage cost database DB35 stores the damage cost data D35 exemplified in FIG. 8 to be described later in detail.

The reliability economic efficiency index database DB36 stores the reliability economic efficiency index data D36 exemplified in FIG. 9 to be described later in detail.

Figure 13:
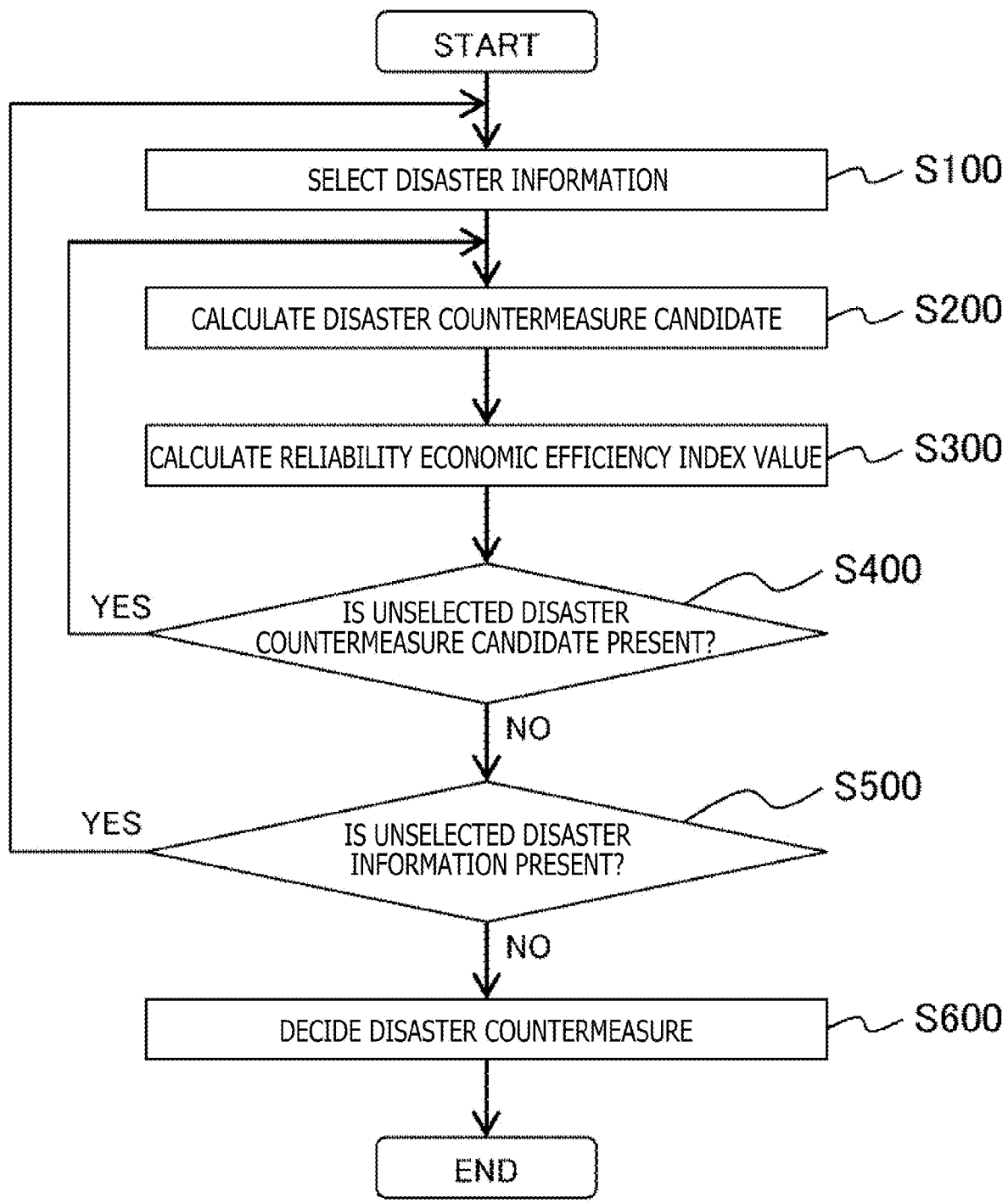
FIG. 13 is a flowchart for showing an example of disaster countermeasure decision processing content of the electric power system planning operation device according to the first embodiment.

The disaster countermeasure calculation unit 20 is a function for calculating a disaster countermeasure, and the content of a series of processes thereof is shown in the flowchart of FIG. 13. In addition, the disaster countermeasure calculation unit 20 is configured using the following processing functions 21 to 24.

The disaster information selection unit 21 is a function for selecting the disaster information data D31 stored in the disaster information database DB31, and outputs the selection result to a disaster information selection result database DB41 as the disaster information selection result data D41.

The disaster countermeasure candidate calculation unit 22 is a function for calculating a countermeasure candidate for the disaster selected in the disaster information selection unit 21. A disaster countermeasure candidate related to system maintenance and system operations is calculated by using the disaster information selection result data D41, the system maintenance countermeasure candidate data D32, and the system operation countermeasure candidate data D33, and is output to a disaster countermeasure candidate calculation result database DB42 as the disaster countermeasure candidate calculation result data D42.

The reliability economic efficiency index value calculation unit 23 is a function for calculating a reliability economic efficiency index value for the disaster countermeasure candidate calculated in the disaster countermeasure candidate calculation unit 22. The reliability economic efficiency index value of the disaster countermeasure candidate related to system maintenance and system operations is calculated by using the disaster countermeasure candidate calculation result data D42, the system data D34, the damage cost data D35, and the reliability economic efficiency index data D36, and is output to a reliability economic efficiency index value calculation result database DB43 as the reliability economic efficiency index value calculation result data D43.

The disaster countermeasure decision unit 24 is a function for deciding a disaster countermeasure on the basis of the reliability economic efficiency index value calculated in the reliability economic efficiency index value calculation unit 23. A disaster countermeasure related to system maintenance and system operations is decided by using the reliability economic efficiency index value calculation result data D43, and is output to a disaster countermeasure decision result database DB44 as the disaster countermeasure decision result data D44.

The disaster countermeasure calculation result data D40 is configured using the following databases DB41 to DB44.

The disaster information selection result database DB41 stores the selection result data D41 selected from the disaster information stored in the disaster information database DB31.

The disaster countermeasure candidate calculation result database DB42 stores the disaster countermeasure candidate calculation result data D42 exemplified in FIG. 10 to be described later in detail.

The reliability economic efficiency index value calculation result database DB43 stores the reliability economic efficiency index value calculation result data D43 exemplified in FIG. 11 to be described later in detail.

The disaster countermeasure decision result database DB44 stores the disaster countermeasure decision result data D44 exemplified in FIG. 12 to be described later in detail.

It should be noted that these data stored in the disaster countermeasure calculation result database DB40 include not only data as the calculation results but also data of the results at the time of an intermediate process, and can be diverted in appropriate situations. Detailed examples of these stored content will be described later with reference to the respective drawings.

Various types of data handled in the electric power system planning operation device 10 are processed in an appropriate format that is easy to see, and displayed on the display unit 50. In addition, the function of the display unit 50 includes input means such as a mouse and a keyboard, and the input result is appropriately reflected on the display screen.

Figure 2:
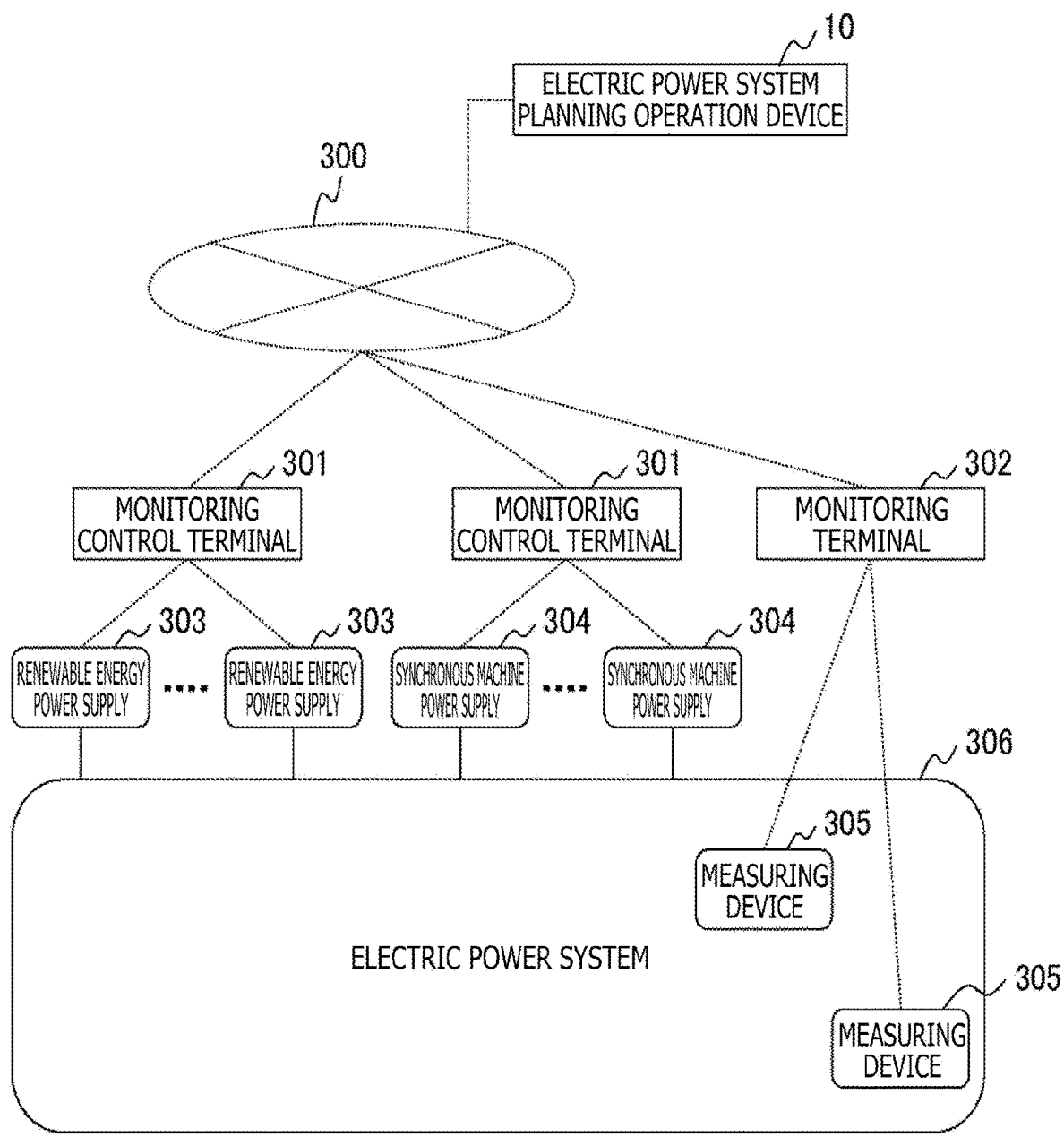
FIG. 2 is a diagram for showing an entire configuration example of an electric power system planning operation system in the case where the electric power system planning operation device of FIG. 1 is applied, particularly from the point of view of hardware outside the electric power system planning operation device.

FIG. 2 is a diagram for showing an entire configuration example of an electric power system planning operation system in the case where the electric power system planning operation device 10 of FIG. 1 is applied, particularly from the point of view of hardware outside the electric power system planning operation device 10. The electric power system planning operation device 10 can transmit and receive data, via a communication network 300, to and from monitoring control terminals 301 for monitoring and controlling synchronous machine power supplies 304 such as thermal power generation, nuclear power generation, and hydroelectric power generation linked with an electric power system 306 and renewable energy power supplies 303 such as solar power generation and wind power generation, and a monitoring terminal 302 for monitoring measuring devices 305 for measuring tidal current distribution in the electric power system.

Figure 3:
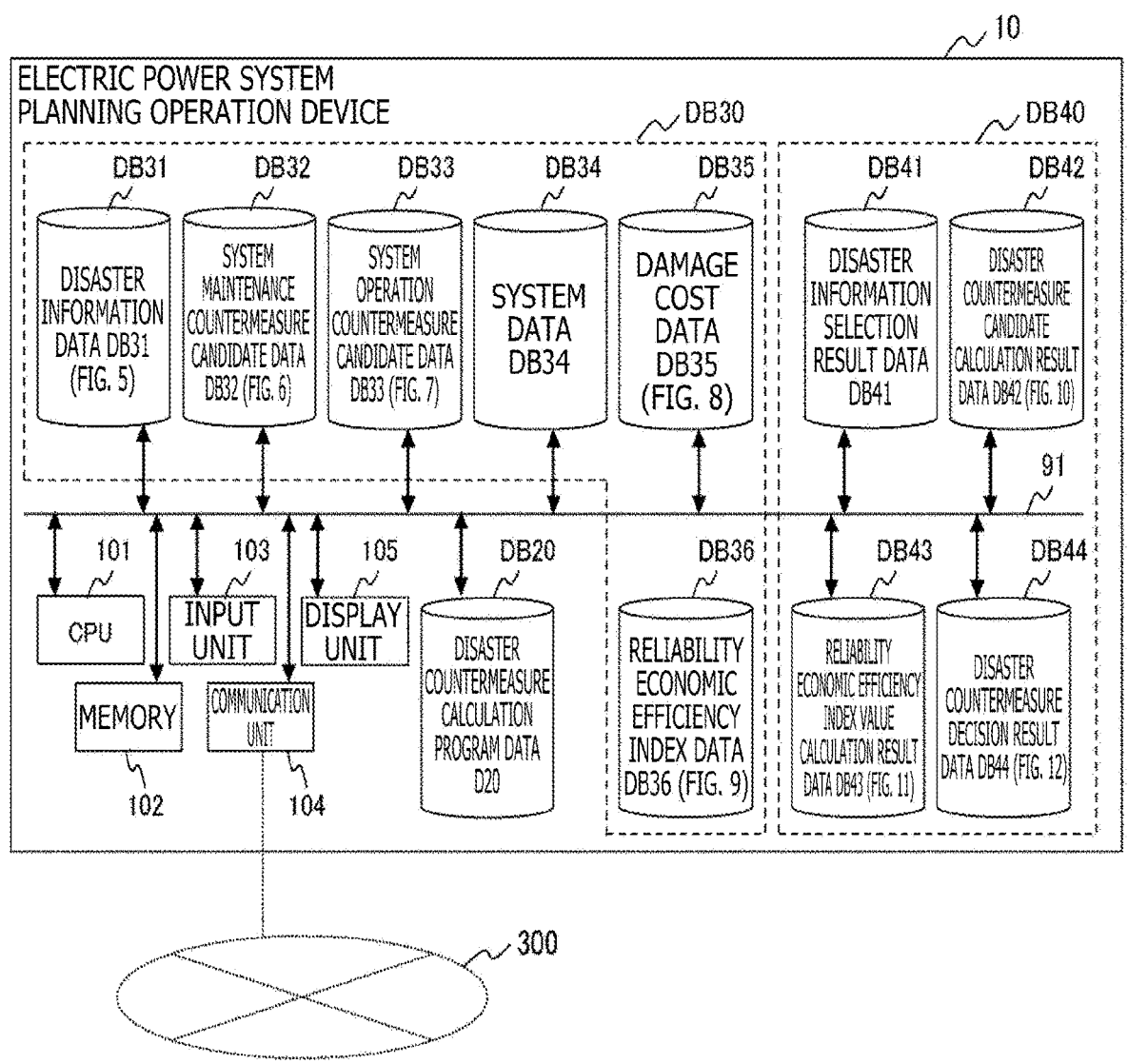
FIG. 3 is a diagram for showing a hardware configuration example of the electric power system planning operation device of FIG. 1.

FIG. 3 is a diagram for showing an entire configuration example of the electric power system planning operation system in the case where the electric power system planning operation device 10 of FIG. 1 is applied, particularly from the point of view of the databases and hardware inside the electric power system planning operation device 10.

The hardware configuration of the electric power system planning operation device 10 shown in FIG. 3 will be described. In the electric power system planning operation device 10, a display unit 105, an input unit 103 such as a keyboard and a mouse, a communication unit 104, a computer or a computer server (CPU: Central Processing Unit) 101, a memory 102, the disaster countermeasure calculation input database DB30 (the disaster information database DB31, the system maintenance countermeasure candidate database DB32, the system operation countermeasure candidate database DB33, the system database DB34, the damage cost database DB35, and the reliability economic efficiency index data DB36), the disaster countermeasure calculation result database DB40 (the disaster information selection result database DB41, the disaster countermeasure candidate calculation result database DB42, the reliability economic efficiency index value calculation result database DB43, and the disaster countermeasure decision result database DB44), and a disaster countermeasure calculation program database DB20 are connected to a bus line 91.

Among these, the display unit 105 is configured as, for example, a display device. In addition, the display unit 105 may be configured to use, for example, a printer device or a sound output device in place of the display device or together with the display device.

The input unit 103 can be configured by including at least any one of a keyboard switch, a pointing device such as a mouse, a touch panel, and a voice instruction device.

The communication unit 104 includes a circuit and a communication protocol for connecting to the communication network 300.

The CPU 101 executes a predetermined computer program by reading the predetermined computer program from the disaster countermeasure calculation program database DB20. The CPU 101 may be configured as one or more semiconductor chips, or may be configured as a computer device such as a computing server.

The memory 102 is configured as, for example, a random access memory (RAM), and stores a computer program read from the disaster countermeasure calculation program database DB20 and stores calculation result data, image data, and the like necessary for each process. Screen data stored in the memory 102 is sent to the display unit 105 for display. An example of the screen to be displayed will be described later.

Figure 4:
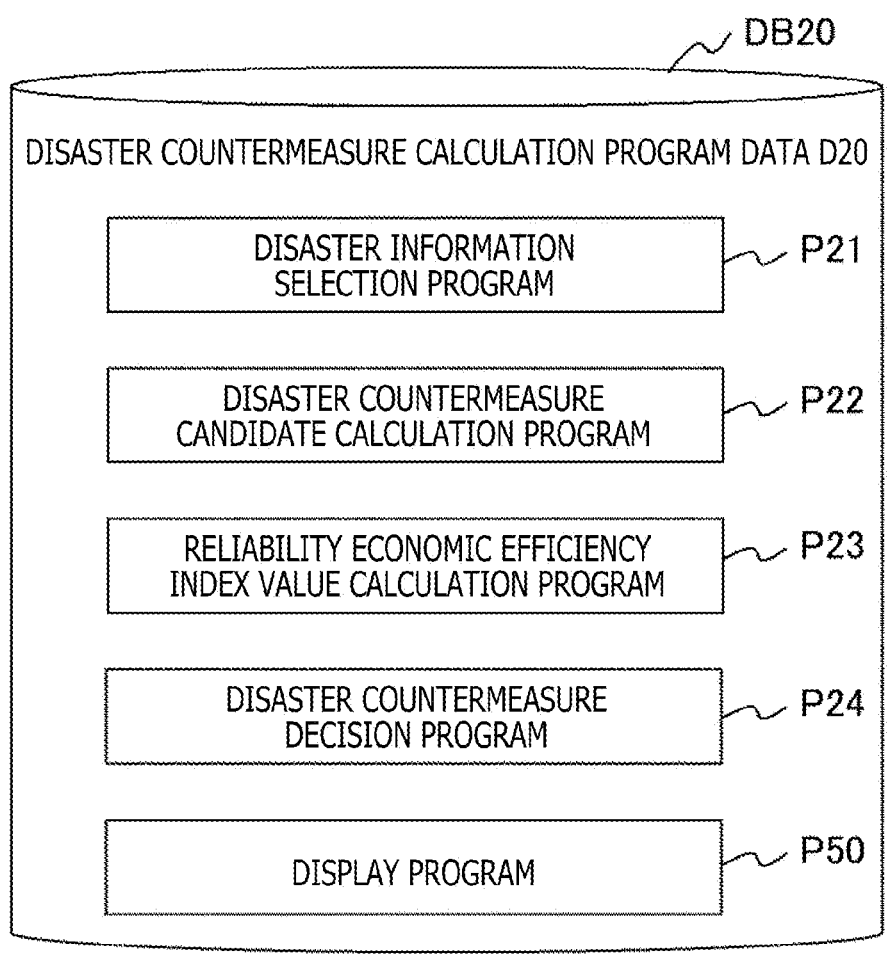
FIG. 4 is a diagram for showing a configuration example showing the content of disaster countermeasure calculation program data of the electric power system planning operation device of FIG. 1.

Here, the content stored in the disaster countermeasure calculation program database DB20 will be described with reference to FIG. 4. FIG. 4 is a diagram for showing a configuration example showing the content of program data of the electric power system planning operation device 10. The disaster countermeasure calculation program database DB20 stores, for example, a disaster information selection program P21, a disaster countermeasure candidate calculation program P22, a reliability economic efficiency index value calculation program P23, a disaster countermeasure decision program P24, and a display program P50.

Referring back to FIG. 3, the CPU 101 executes the arithmetic programs (the disaster information selection program P21, the disaster countermeasure candidate calculation program P22, the reliability economic efficiency index value calculation program P23, the disaster countermeasure decision program P24, and the display program P50) read from the disaster countermeasure calculation program database DB20 into the memory 102 to select disaster information, calculate a disaster countermeasure candidate, calculate a reliability economic efficiency index value, decide a disaster countermeasure, give instruction on image data to be displayed, search data in various types of databases, and the like.

The memory 102 is a memory for temporarily storing calculation temporary data and calculation result data such as image data for display, the disaster information selection result data D41, the disaster countermeasure candidate calculation result data D42, the reliability economic efficiency index value calculation result data D43, and the disaster countermeasure decision result data D44, and the CPU 101 generates necessary image data to display the generated image data on the display unit 105 (for example, a display screen). It should be noted that the display unit 105 of the electric power system planning operation device 10 may be a simple screen only for rewriting each program or database.

The electric power system planning operation device 10 stores roughly 10 databases related to input and output. Hereinafter, other than the system database DB34 and the disaster information selection result database DB41 described above, the disaster information database DB31, the system maintenance countermeasure candidate database DB32, the system operation countermeasure candidate database DB33, the damage cost database DB35, the reliability economic efficiency index value database DB36, the disaster countermeasure candidate calculation result database DB42, the reliability economic efficiency index value calculation result database DB43, and the disaster countermeasure decision result database DB44 will be described.

The disaster information database DB31 stores the disaster information data D31 as shown in FIG. 5. The disaster information data D31 is stored for each disaster type (D311A and D312B). FIG. 5 shows cases of an earthquake (D311A) and a typhoon (D311B) as examples of the disaster types. In the case of the earthquake (D311A), the disaster information data D31 stores information such as an earthquake case name (D312A), the seismic center (D313A) of the earthquake, the seismic intensity (D314A) of the earthquake, a damaged facility (D315A) and damage content (D316A) by the earthquake, and a damage occurrence probability (D317A).

For example, an earthquake case CE1 of FIG. 5 is an earthquake in which the seismic center is a point A and the seismic intensity is 7, and shows that the damaged facility and the damage content by the earthquake are falling of a power plant G10, falling of a power plant G20, and shut-off of a transmission line L10 and the damage occurrence probabilities are 0.00011, 0.00005, and 0.00008, respectively.

In the case of the typhoon, the disaster information data D31 stores information such as a typhoon case name (D311B), a date and time (D312B), the central position (D313B) of the typhoon, the central atmospheric pressure (D314B) of the typhoon, the maximum wind speed (D315B) of the typhoon, the storm zone radius (D316B) of the typhoon, the strong wind zone radius (D317B) of the typhoon, a damaged facility (D318B) and damage content (D319B) by the typhoon, and a damage occurrence probability (D320B).

For example, a typhoon case CT1 of FIG. 5 has the following characteristics. It shows that at 18:00 on MM DD, YYYY, the central position is at N1 north latitude and E1 east longitude, the central atmospheric pressure is 1000 hPa, the maximum wind speed is 30 m/s, the storm zone radius is 50 km, the strong wind zone radius is 300 km, and the damaged facility and the damage content by the typhoon and the damage occurrence probability at that time are absent. On the other hand, it shows that at 21:00 on MM DD, YYYY, the central position is at N2 north latitude and E2 east longitude, the central atmospheric pressure is 950 hPa, the maximum wind speed is 40 m/s, the storm zone radius is 70 km, the strong wind zone radius is 400 km, the damaged facility and the damage content by the typhoon at that time are shut-off of a transmission line L21, and the damage occurrence probability is 0.05.

It should be noted that the disaster types (D311A and D311B) may be information about disasters other than earthquakes and typhoons, such as tsunamis, fires, lightning strikes, and snowfalls. By including the information as described above, damage to the electric power system due to the disaster can be concretized. In addition, the reliability economic efficiency index value for the disaster countermeasure candidate can be quantitatively and accurately calculated.

The system maintenance countermeasure candidate database DB32 stores the system maintenance countermeasure candidate data D32 as shown in FIG. 6. The system maintenance countermeasure candidate data D32 is stored for each system maintenance countermeasure type (D321A, D321B, and D321C).

FIG. 6 shows cases of transmission line extension (D321A), substation extension (D321B), and phase modifying facility extension (D321C) as examples of the system maintenance countermeasure types. In the case of the transmission line extension, the system maintenance countermeasure candidate data D32 stores information such as a transmission line extension case name (D322A), the name (D323A) of the transmission line, the number of lines (D324A) of the transmission lines, a substation name (D325A) at the transmission end and the reception end of the transmission line, and the cost (D326A) of the extension of the transmission line.

For example, a transmission line extension case CL1 of FIG. 6 shows that a transmission line L1 having one line connecting a substation S1 at the transmission end and a substation S2 at the reception end is extended at a cost of 100 billion yen. In the case of the substation extension, the system maintenance countermeasure candidate data D32 stores information such as a substation extension case name (D322B), the name (D323B) of the substation, the number of transformer banks (D324B) of the substation, and the cost (D325B) of the extension of the substation.

For example, a substation extension case CS1 of FIG. 6 shows that the substation S1 having two banks is extended at a cost of 10 billion yen. In the case of the phase modifying facility extension, information such as a phase modifying facility extension case name (D322C), the name (D323C) of the phase modifying facility, the number of phase modifying facilities (D324C), a substation name (D325C) in which the phase modifying facility is extended, and the cost (D326C) of the extension of the phase modifying facility is written in the system maintenance countermeasure candidate data D32.

For example, a phase modifying facility extension case CY1 of FIG. 6 shows that one phase modifying facility Y1 is extended in the substation S1 at a cost of 5 million yen. Here, the phase modifying facility is a static condensor (SC), a shunt reactor (ShR), or the like.

It should be noted that the system maintenance countermeasure types (D321A, D321B, and D321C) may be system maintenance countermeasures other than the transmission line extension, the substation extension, and the phase modifying facility extension, and include, for example, a high voltage direct current (HVDC), a synchronous phase modifier, a static var compensator (SVC), a self-excited SVC, a static var generator (SVG), a static synchronous compensator (STATCOM), a phase shifter, or other system maintenance countermeasures.

By including the information as described above, the disaster countermeasure candidate related to the system maintenance can be concretized. In addition, the reliability economic efficiency index value for the disaster countermeasure candidate can be quantitatively and accurately calculated.

The system operation countermeasure candidate database DB33 stores the system operation countermeasure candidate data D33 as shown in FIG. 7. The system operation countermeasure candidate data D33 is stored for each system operation countermeasure type (D331).

FIG. 7 shows a case of an operation change in a power plant as an example of the system operation countermeasure type. In the case of the operation change in the power plant, information such as a power plant name (D333), the output current value, the output upper limit value, and the output lower limit value (D334) of the power plant, and the cost (D335) of increasing (raising) and decreasing (lowering) the output of the power plant is stored in the system operation countermeasure candidate data D33 for each date and time (D332).

For example, FIG. 7 shows that at 00:00 on MM DD, YYYY, the current output of a power plant G1 is 500 MW, the output upper limit is 1000 MW, the output lower limit is 300 MW, the cost of increasing the output is 6 yen/kWh, and the cost of decreasing the output is −6 yen/kWh.

It should be noted that the system operation countermeasure type (D311) may be a system operation countermeasure other than the operation change in the power plant, and include, for example, starting or stopping of a power plant, changing of a substation tap, installing or opening of a substation phase modifying facility, installing or opening of a transmission line, or other system operation countermeasures.

By including the information as described above, the disaster countermeasure candidate related to the system operation can be concretized. In addition, the reliability economic efficiency index value for the disaster countermeasure candidate can be quantitatively and accurately calculated.

The damage cost database DB35 stores the damage cost data D35 as shown in FIG. 8. The damage cost data D35 stores information such as a substation name (D351) and a cost (D352) associated with a power failure of the substation.

For example, FIG. 8 shows that the power failure of a substation S1 causes the damage of a cost of 4000 yen/kWh. It should be noted that the damage cost data D35 may be a cost for each individual customer, a cost for each customer type (an ordinary home, a factory, an office, a hospital, or the like), or other types. By including the information as described above, the reliability economic efficiency index value for the disaster countermeasure candidate can be quantitatively and accurately calculated.

The reliability economic efficiency index database DB36 stores the reliability economic efficiency index data D36 as shown in FIG. 9. The reliability economic efficiency index data D36 stores information such as a reliability economic efficiency index type (D361) and a weight coefficient (D362) for each index.

For example, FIG. 9 shows that there are a countermeasure cost and a damage cost expectation value as the reliability economic efficiency index types, the weight of the countermeasure cost is 1, and the weight of the damage cost expectation value is 1000. It should be noted that the reliability economic efficiency index value type (D361) may be loss of load probability (LOLP), loss of load expectation (LOLE), expected unserved energy (EUE), value of lost load (VOLL), an index (the presence or absence of step-out of a generator, the maximum value of the internal phase difference angle of a generator, a load margin up to the nose point of the P-V curve, a short circuit capacity, a short circuit ratio (SCR), the maximum frequency drop value, rate of change of frequency (RoCoF), the overload rate of a transmission line, or the overload amount of a transmission line) related to system stability (synchronous stability, voltage stability, frequency stability, overload, or the like), or other indexes. By including the information as described above, the reliability economic efficiency index value for the disaster countermeasure candidate can be quantitatively calculated.

The disaster countermeasure candidate calculation result database DB42 stores the disaster countermeasure candidate calculation result data D42 as shown in FIG. 10. The disaster countermeasure candidate calculation result data D42 is stored for each disaster countermeasure case (D421). In FIG. 10, CC1 and CC2 are presented as the disaster countermeasure cases (D421). The disaster countermeasure case (D421) stores information such as a system maintenance countermeasure (D421A) and a system operation countermeasure (D421B).

The system maintenance countermeasure (D421A) is stored for each system maintenance countermeasure type (D422A, D423A, and D424A) corresponding to the system maintenance countermeasure stored in the system maintenance countermeasure candidate data D32. In the case where the system maintenance countermeasure types are transmission line extension, substation extension, and phase modifying facility extension, information such as a transmission line extension case name (D422A), a substation extension case name (D423A), and a phase modifying facility extension case name (D424A) is stored.

The system operation countermeasure (D421B) is stored for each system operation countermeasure type (D422B) corresponding to the system operation countermeasure stored in the system operation countermeasure candidate data D33. In the case where the system operation countermeasure type (D422B) is an operation change in a power plant, information such as a power plant name (D424B), and the output value before change, the output upper limit value, the output lower limit value, and the output value after change (D425B) of the power plant is stored for each date and time (D423B).

For example, in FIG. 10, the disaster countermeasure case CC1 shows that the transmission line extension, the substation extension, and the phase modifying facility extension are unchanged as the system maintenance countermeasure, and the output of a power plant G1 at 00:00 on MM DD, YYYY is changed from 500 MW to 1000 MW and the output of a power plant G2 is changed from 300 MW to 150 MW as the system operation countermeasure. In addition, the disaster countermeasure case CC2 shows the transmission line extension case CL1 and the substation extension case CS1 stored in the system maintenance countermeasure candidate data D32 as the system maintenance countermeasure, and shows that the system operation countermeasure is unchanged.

Each the disaster countermeasure case CC1 and the disaster countermeasure case CC2 shows an example of a case of only the system operation countermeasure and a case of only the system maintenance countermeasure as the disaster countermeasures. It should be noted that the system maintenance countermeasure types (D422A, D423A, and D422A) may be other system maintenance countermeasures described in the description of the system maintenance countermeasure candidate database DB32. In addition, the system operation countermeasure type (D422B) may be another system operation countermeasure described in the description of the system operation countermeasure candidate database DB33. By including the information as described above, each disaster countermeasure candidate can be concretized. In addition, the reliability economic efficiency index value for the disaster countermeasure candidate can be quantitatively and accurately calculated.

The reliability economic efficiency index value calculation result database DB43 stores the reliability economic efficiency index value calculation result data D43 as shown in FIG. 11. The reliability economic efficiency index value calculation result data D43 stores information such as a disaster case name (D431) corresponding to the disaster case stored in the disaster information selection result data D41, a disaster countermeasure case name (D432) corresponding to the disaster countermeasure case stored in the disaster countermeasure candidate calculation result data D42, a countermeasure cost per year (D433) at the time of implementing the disaster countermeasure case, a damage cost expectation value per year (D434) at the time of implementing the disaster countermeasure case, and a reliability economic efficiency index value (D435) at the time of implementing the disaster countermeasure case.

The countermeasure cost per year (D433) at the time of implementing the disaster countermeasure case is obtained, for example, by dividing the cost (D326A, D325B, and D326D) stored in the system maintenance countermeasure candidate data D32 corresponding to the system maintenance countermeasure to be implemented in the disaster countermeasure case (D432) by the number of years required for facility extension.

In addition, the countermeasure cost per year (D433) at the time of implementing the disaster countermeasure case is obtained, for example, by multiplying the cost (D335) stored in the system operation countermeasure candidate data D33 corresponding to the system operation countermeasure to be implemented in the disaster countermeasure case (D432) by the difference value before and after the output change in the power plant.

In addition, the damage cost expectation value per year (D434) at the time of implementing the disaster countermeasure case is obtained, for example, as follows. First, system stability (synchronous stability, voltage stability, frequency stability, overload, or the like) is evaluated by a system analysis that simulates the content of facility damage that occurs in the disaster case (D431) and the system maintenance countermeasure and the system operation countermeasure to be implemented in the disaster countermeasure case (D432). In the case where the synchronous stability or the voltage stability cannot be maintained, the cost (D352) stored in the damage cost data D35 of FIG. 8 is obtained by assuming that a power failure occurs in all the substations in the area to be analyzed.

On the other hand, in the case where the frequency is lowered, the shut-off amount of the load (substation) simulating an operation of an under frequency relay (UFR) is obtained, and the cost (D352) stored in the damage cost data D35 of FIG. 8 is obtained by assuming that a power failure occurs in the substation to be shut off in the area to be analyzed. In the case where the overload occurs, the cost (D352) stored in the damage cost data D35 of FIG. 8 is obtained by assuming that a power failure occurs in the substation connected to a lower part of the transmission line where the overload occurs.

Further, by multiplying the obtained damage cost by the occurrence probability of the facility damage occurring in the disaster case, the damage cost expectation value per year (D434) at the time of implementing the disaster countermeasure case is obtained. Here, the analysis method of the system stability complies with, for example, "Akihiko Yokoyama, Koji Ota, "System Engineering of the Electric Power System Stabilization," The institute of Electrical Engineers of Japan, 2014," and the like.

The reliability economic efficiency index value (D435) at the time of the implementing the disaster countermeasure case is obtained, for example, as the weighted sum (weighted average value) of the weight coefficients (D362) stored in the corresponding reliability economic efficiency index data D36 to the countermeasure cost per year (D433) and the damage cost expectation value per year (D434) corresponding to the disaster case (D431) and the disaster countermeasure case (D432).

For example, FIG. 11 shows that, as a result of implementing the disaster countermeasure case CC1 for the disaster case CE1, the countermeasure cost is 5 billion yen/year, the damage cost expectation value is one million yen/year, and the reliability economic efficiency index value is 150. It should be noted that the calculation of the countermeasure cost per year (D433) at the time of implementing the disaster countermeasure case, the damage cost expectation value per year (D434) at the time of implementing the disaster countermeasure case, and the reliability economic efficiency index value (D435) at the time of implementing the disaster countermeasure case may be performed by methods other than those described above. In addition, the countermeasure cost per year (D433) at the time of implementing the disaster countermeasure case and the damage cost expectation value per year (D434) at the time of implementing the disaster countermeasure case may be specified years. Thus, the reliability economic efficiency index value for each disaster case and each disaster countermeasure case can be quantitatively calculated and used for comparison.

The disaster countermeasure decision result database DB44 stores the disaster countermeasure decision result data D44 as shown in FIG. 12. The disaster countermeasure decision result data D44 stores information such as a disaster countermeasure case name (D441) corresponding to the disaster countermeasure case stored in the reliability economic efficiency index value calculation result data D43 of FIG. 11, a disaster case name (D442), and a selection result (D444) as a disaster countermeasure against a reliability economic efficiency index value (D443). As the selection of the disaster countermeasure, for example, the disaster countermeasure case in which the sum of the reliability economic efficiency index values (D443) for each disaster case (D442) in the disaster countermeasure case (D441) is the smallest is selected. For example, FIG. 12 shows that the disaster countermeasure case CC1 is selected. It should be noted that the selection of the disaster countermeasure may be made by methods other than those described above.

Thus, the calculation results of the reliability economic efficiency index values for each disaster countermeasure case and each disaster case can be compared with each other, and the selection result and the selection reason can be easily confirmed. In addition, since the disaster countermeasure in which the countermeasure cost and the damage cost can be reduced can be selected, it is possible to achieve both the reduction of social costs and the improvement of electric power resilience.

Next, an example of processing content of the electric power system planning operation device 10 will be described using FIG. 13. FIG. 13 is an example of a flowchart for showing the entire process of the electric power system planning operation device 10.

In a processing step S100 that is the first process of FIG. 13, the disaster information stored in the disaster information data D31 is selected using the disaster information data D31 shown in FIG. 5, and the selection result is output as the disaster information selection result data D41.

In a processing step S200, by using the disaster information selection result data D41, the system maintenance countermeasure candidate data D32 shown in FIG. 6, and the system operation countermeasure candidate data D33 shown in FIG. 7, the countermeasure candidate related to the system maintenance and the system operation for the disaster selected in the processing step S100 is calculated and output as the disaster countermeasure candidate calculation result data D42.

In a processing step S300, by using the disaster countermeasure candidate calculation result data D42, the system data D34, the damage cost data D35 shown in FIG. 8, and the reliability economic efficiency index data D36 shown in FIG. 9, the reliability economic efficiency index value for the disaster countermeasure candidate calculated in the disaster countermeasure candidate calculation unit 22 is calculated and output as the reliability economic efficiency index value calculation result data D43.

In a processing step S400, the presence or absence of a disaster countermeasure candidate unselected in the processing step S200 for the disaster information selected in the processing step S100 is determined. In the case where there is an unselected disaster countermeasure candidate, the process returns to the processing step S200. In the case where there is no unselected disaster countermeasure candidate, the process proceeds to a processing step S500.

In the processing step S500, the presence or absence of disaster information unselected in the processing step S100 is determined. In the case where there is unselected disaster information, the process returns to the processing step S100. In the case where there is no unselected disaster information, the process proceeds to a processing step S600.

In the processing step S600, a disaster countermeasure is decided using the reliability economic efficiency index value calculation result data D43 and output as the disaster countermeasure decision result data D44.

Thus, since the disaster countermeasure for reducing the countermeasure cost and the damage cost can be selected on the basis of the reliability economic efficiency index value D43 calculated from the disaster information data D31, the system maintenance countermeasure candidate data D32, the system operation countermeasure candidate data D33, the damage cost data D35, the system data D34, and the reliability economic efficiency index data D36, it is possible to achieve both the reduction of social costs and the improvement of electric power resilience.

Here, an example of concrete display content will be described with reference to FIG. 14. FIG. 14 shows a screen display of a disaster case 53 and disaster content 54 in disaster information, a disaster countermeasure candidate case 55 and disaster countermeasure candidate content 56 in a disaster countermeasure candidate. These display data items can be freely selected by the user. In addition, a system diagram 51 and an explanatory note 52 are also displayed on the display of FIG. 14, and the display is in a display format in which the user can easily understand the positions of a disaster or a disaster countermeasure candidate.

FIG. 15 is another example of the display content. FIG. 15 shows a screen display of a disaster countermeasure case 57 and a system maintenance countermeasure 58 in a disaster countermeasure, and a date 59, a time 510, content 511, a reliability economic efficiency index value calculation result 512, and a disaster countermeasure decision result 513 in a system operation countermeasure. These display data items can be freely selected by the user. In addition, a system diagram 51 and an explanatory note 52 are also displayed on the display of FIG. 15, and the display is in a display format in which the user can easily understand the position a disaster countermeasure.

Second Embodiment

In a second embodiment, an example of an electric power system planning operation device that can achieve both the reduction of adjustment force operation costs and the improvement of electric power resilience in a central power feed command system (EMS) by transmitting the disaster countermeasure decision result D44 to the central power feed command system will be described. It should be noted that the description that overlaps with the content described in FIG. 1 to FIG. 15 will be omitted.

Figure 16:
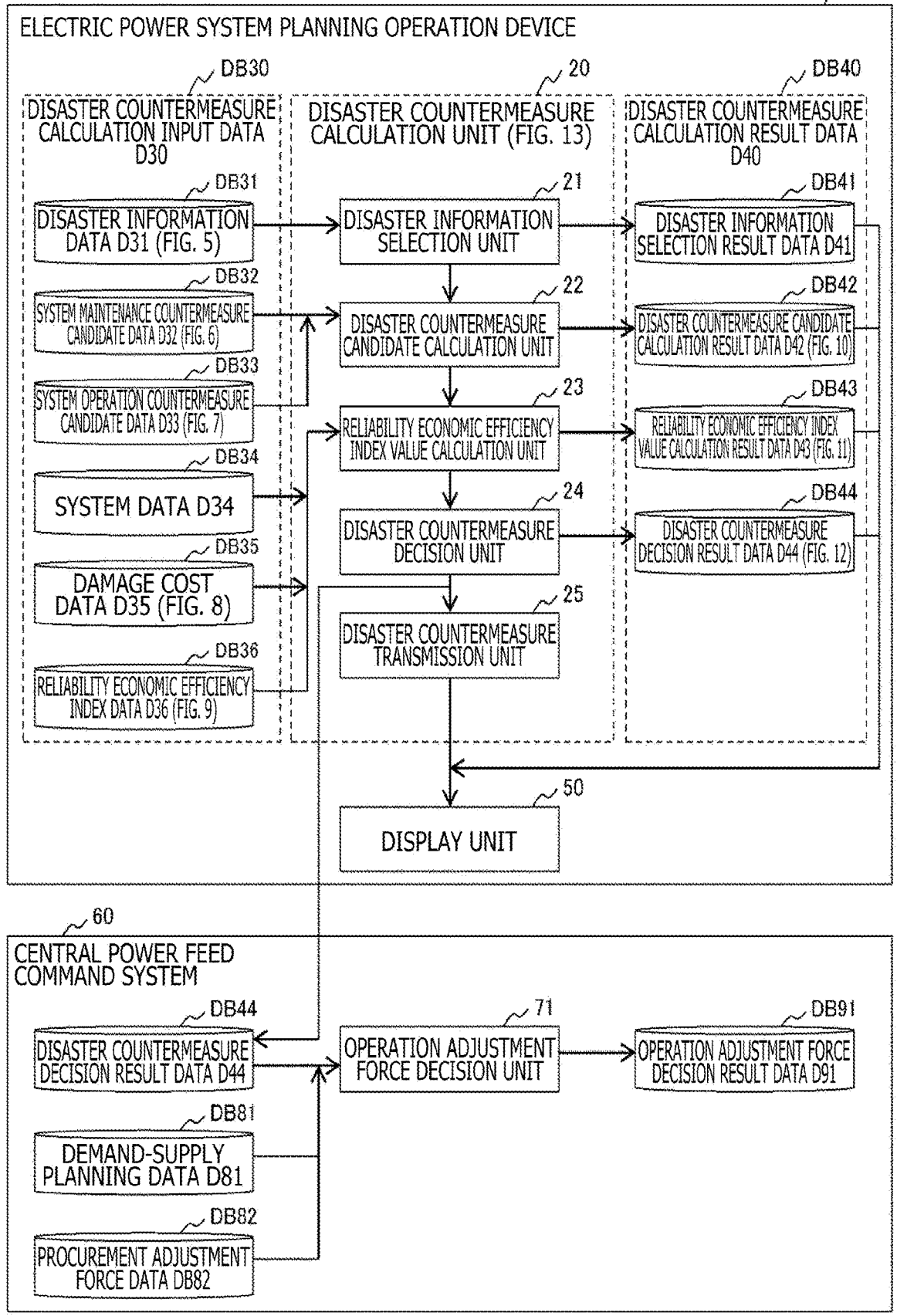
FIG. 16 is a diagram for showing an entire configuration example of an electric power system planning operation device according to a second embodiment.

FIG. 16 is a diagram for showing an entire configuration of an electric power system planning operation device 10 according to the second embodiment. It should be noted that FIG. 16 represents the electric power system planning operation device 10 from the point of view of the functional configuration thereof. In the electric power system planning operation device of FIG. 16, a disaster countermeasure transmission unit 25 and a central power feed command system 60 are added in the electric power system planning operation device 10 of FIG. 1. In FIG. 16, the description of portions having the same functions as the configurations to which the same reference numerals shown in FIG. 1 described above are added will be omitted.

The disaster countermeasure transmission unit 25 is a function for transmitting the disaster countermeasure decided by the disaster countermeasure decision unit 24. The disaster countermeasure decision result data D44 is transmitted to the central power feed command system 60.

The central power feed command system 60 stores roughly four databases. Hereinafter, other than the already-described disaster countermeasure decision database DB44, a demand-supply planning database DB81, a procurement adjustment force database DB82, and an operation adjustment force decision result database DB91 will be described.

The demand-supply planning database DB81 stores information about a power generation plan and a demand-supply plan provided by a power generation business operator and a retail business operator to a general power transmission and distribution business operator, and the like. The procurement adjustment force database DB82 stores information about an adjustment force procured in a demand-supply adjustment market, and the like. The operation adjustment force decision result database D91 stores information about a decision result of the adjustment force to be operated, and the like.

An operation adjustment force decision unit 71 in the central power feed command system 60 decides the adjustment force to be operated by using the disaster countermeasure decision result data D44, the demand-supply planning data D81, and procurement adjustment force data D82, and outputs the operation adjustment force decision result data D91.

In the decision method of the adjustment force to be operated, for example, the imbalance in power generation and load is predicted from the demand-supply planning data D81, and a power plant output change amount capable of adjusting the imbalance is obtained in merit order from the adjustment force stored in the procurement adjustment force data D82 and the power plant output change amount stored in the disaster countermeasure decision result data D44. It should be noted that the decision method of the operation adjustment force may be a method other than the above method.

Thus, in addition to suppression of demand and supply for the imbalance between power generation and demand and frequency fluctuations, it is possible to operate the adjustment force that can achieve both the reduction of adjustment force operation costs and the improvement of electric power resilience.

Figure 17:
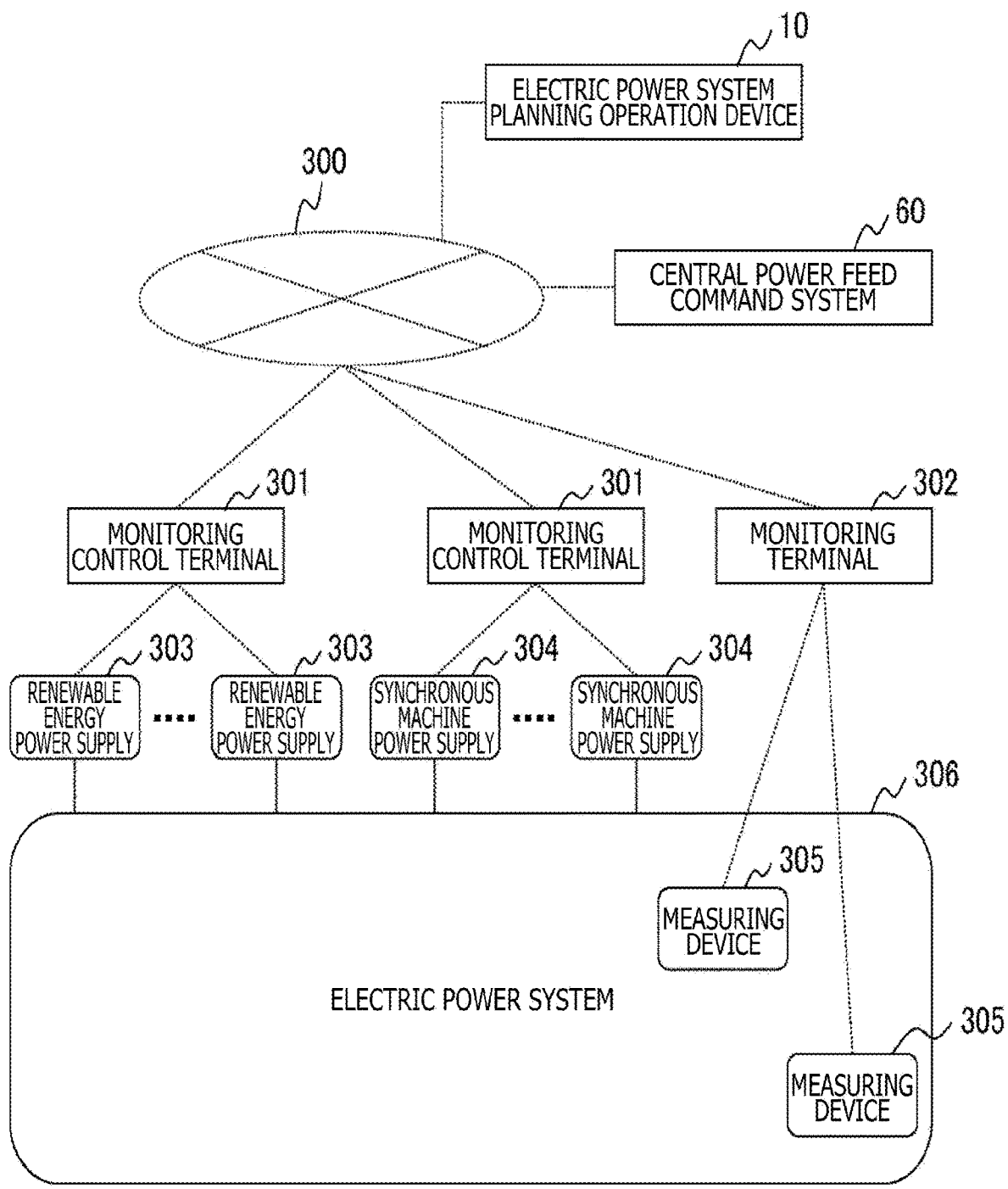
FIG. 17 is a diagram for showing an entire configuration example of an electric power system planning operation system in the case where the electric power system planning operation device of FIG. 15 is applied, particularly from the point of view of hardware outside the electric power system planning operation device.

FIG. 17 is a diagram for showing an entire configuration example of an electric power system planning operation system in the case where the electric power system planning operation device 10 of FIG. 16 according to the second embodiment is applied, particularly from the point of view of hardware outside the electric power system planning operation device 10. In the electric power system planning operation device of FIG. 17, the central power feed command system 60 is added in the electric power system planning operation device 10 of FIG. 2. In FIG. 17, the description of portions having the same functions as the configurations to which the same reference numerals shown in FIG. 2 described above are added will be omitted. In FIG. 17, the electric power system planning operation device 10 can transmit and receive data to and from the central power feed command system 60 via the communication network 300.

It should be noted that in the embodiment, the electric power system planning operation device 10 can transmit and receive data to and from the central power feed command system 60 via the external communication network 300, but the electric power system planning operation device 10 may be an internal device of the central power feed command system 60 and data may be transmitted and received via an internal communication network. In addition, in the embodiment, the central power feed command system 60 as the transmission destination of the disaster countermeasure decision result data D44 has been described as an example, but a system stabilization system, a basic power feed command system, a system power feed command system, a market management system, or the like may also be used.

Third Embodiment

In a third embodiment, an example of an electric power system planning operation device that can achieve both the reduction of system planning costs and the improvement of electric power resilience in a system planning system 1100 by transmitting the disaster countermeasure decision result D44 to the system planning system 1100 will be described. It should be noted that the description that overlaps with the content described in FIG. 1 to FIG. 17 will be omitted.

FIG. 18 is a diagram for showing an entire configuration of an electric power system planning operation device 10 according to the third embodiment. It should be noted that FIG. 18 represents the electric power system planning operation device 10 from the point of view of the functional configuration thereof. In the electric power system planning operation device of FIG. 18, the disaster countermeasure transmission unit 25 and the system planning system 1100 are added in the electric power system planning operation device 10 of FIG. 1. In FIG. 18, the description of portions having the same functions as the configurations to which the same reference numerals shown in FIG. 1 described above are added will be omitted.

The disaster countermeasure transmission unit 25 is a function for transmitting the disaster countermeasure decided by the disaster countermeasure decision unit 24. The disaster countermeasure decision result data D44 is transmitted to the system planning system 1100.

The system planning system 1100 stores roughly six databases. Hereinafter, other than the disaster countermeasure decision database DB44, the demand-supply planning database DB81, and the system database DB34 which have already been described, a facility planning decision result database DB1401, a work stop planning database DB1402, and an operation planning decision result database DB1403 will be described.

The facility planning decision result database DB1401 stores information about the decision result of a facility plan related to the system maintenance countermeasure as described in the description of the system maintenance countermeasure candidate database DB32, and the like. The work stop planning decision result database DB1402 stores information about the decision result of a work stop plan of the facility related to the system maintenance countermeasure, and the like. The operation planning decision result data DB1403 stores information about the decision result of an operation plan of the facility related to the system maintenance countermeasure, and the like.

A facility planning decision unit 1201 in the system planning system 1100 decides a facility plan related to the system maintenance countermeasure as described in the description of the system maintenance countermeasure candidate database DB32 by using the disaster countermeasure decision result data D44, the demand-supply planning data D81, and the system data DB34, and outputs facility planning decision result data D1401. In the decision method of the facility plan, for example, a facility plan having a low facility extension cost and capable of maintaining the N−1 standard and the system stability shown in the description of the reliability economic efficiency index value calculation result database DB43 is obtained. It should be noted that the decision method of the facility plan may be a method other than the above method.

A work stop planning decision unit 1202 in the system planning system 1100 decides a work stop plan of the facility related to the system maintenance countermeasure by using the facility planning decision result data D1401, and outputs work stop planning result data D1402. In the decision method of the work stop plan, for example, a work stop plan having a low work stop cost and capable of maintaining the N−1 standard and the system stability shown in the description of the reliability economic efficiency index value calculation result database DB43 is obtained. It should be noted that the decision method of the work stop plan may be a method other than the above method.

An operation planning decision unit 1203 in the system planning system 1100 decides an operation plan of the facility related to the system maintenance countermeasure by using the work stop planning decision result data D1402, and outputs the system operation planning decision result data D1403. In the decision method of the operation plan, for example, an operation plan having a low operation cost and capable of maintaining the N−1 standard and the system stability shown in the description of the reliability economic efficiency index value calculation result database DB43 is obtained. It should be noted that the decision method of the operation plan may be a method other than the above method.

Thus, in addition to maintaining the N−1 standard and the system stability, it is possible to achieve both the reduction of system maintenance costs and the improvement of electric power resilience.

Figure 19:
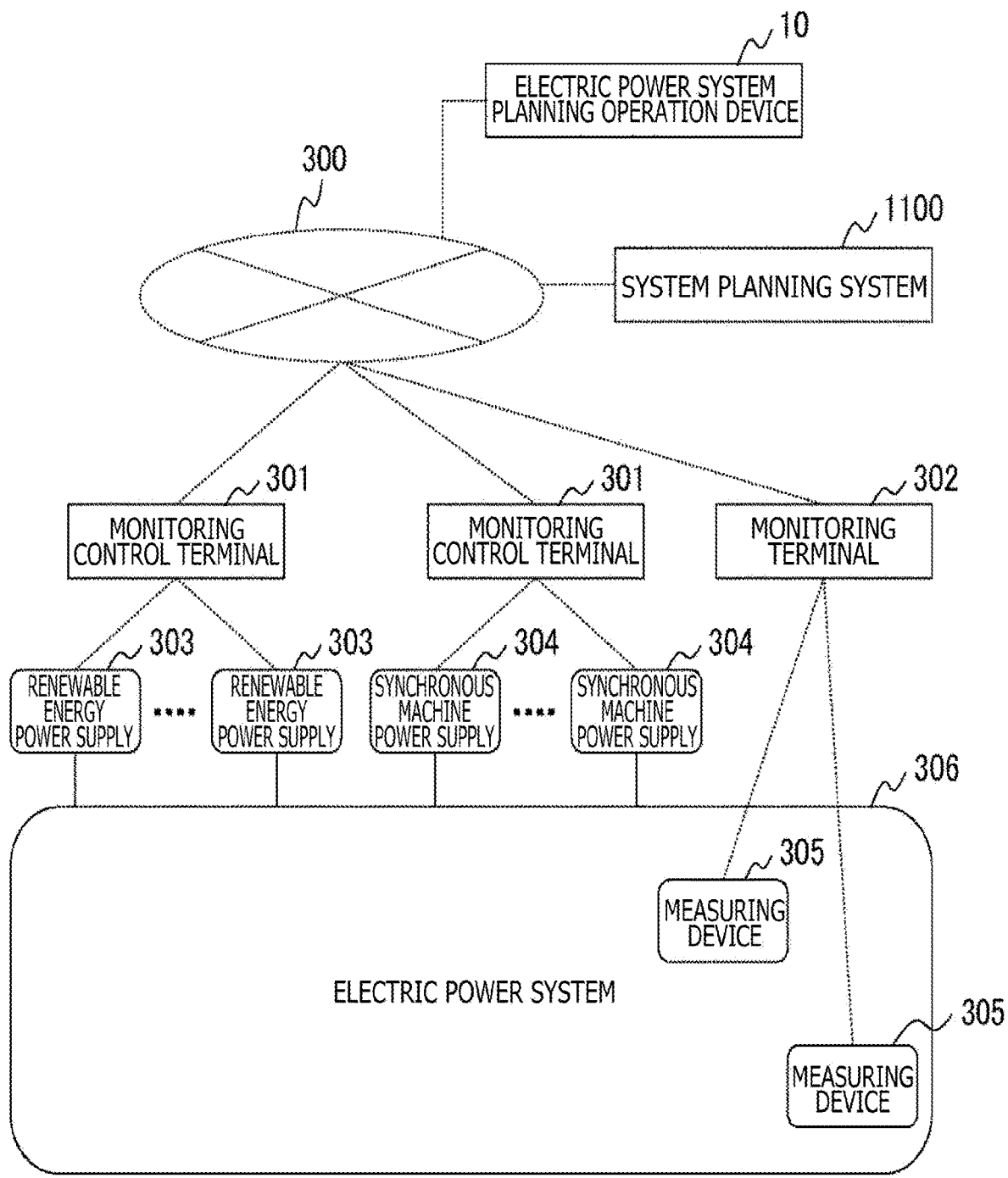
FIG. 19 is a diagram for showing an entire configuration example of an electric power system planning operation system in the case where the electric power system planning operation device of FIG. 15 is applied, particularly from the point of view of hardware outside the electric power system planning operation device.

FIG. 19 is a diagram for showing an entire configuration example of an electric power system planning operation system in the case where the electric power system planning operation device 10 of FIG. 18 according to the third embodiment is applied, particularly from the point of view of hardware outside the electric power system planning operation device 10. In the electric power system planning operation device of FIG. 19, the system planning system 1100 is added in the electric power system planning operation device 10 of FIG. 2. In FIG. 19, the description of portions having the same functions as the configurations to which the same reference numerals shown in FIG. 2 described above are added will be omitted. In FIG. 19, the electric power system planning operation device 10 can transmit and receive data to and from the system planning system 1100 via the communication network 300.

It should be noted that in the embodiment, the electric power system planning operation device 10 can transmit and receive data to and from the system planning system 1100 via the external communication network 300, but the electric power system planning operation device 10 may be an internal device of the system planning system 1100 and data may be transmitted and received via an internal communication network. In addition, in the embodiment, the system planning system 1100 as the transmission destination of the disaster countermeasure decision result data D44 has been described as an example, but a system stabilization system, a basic power feed command system, a system power feed command system, a market management system, or the like may also be used.

What is claimed is:

1. An electric power system planning operation device against occurrence of a disaster, the electric power system planning operation device comprising:
a disaster information selection unit that selects disaster information data of a disaster type to be handled and uses the selected disaster information data as disaster information selection result data, from disaster information data for each disaster type;
a disaster countermeasure candidate calculation unit that calculates a disaster countermeasure candidate by use of the disaster information selection result data, system maintenance countermeasure candidate data that is information about performing maintenance of a system facility in preparation for a disaster, and system operation countermeasure candidate data that is information about defining a system operation countermeasure in preparation for a disaster, the disaster countermeasure candidate calculation unit using the calculated disaster countermeasure candidate as disaster countermeasure candidate calculation result data;
a reliability economic efficiency index value calculation unit that calculates a reliability economic efficiency index value for the disaster countermeasure candidate calculation result data by use of the disaster countermeasure candidate calculation result data, system data that is information about the configuration of an electric power system, damage cost data that is information about an amount of damage to the electric power system at a time of an assumed disaster type, and reliability economic efficiency index data that is information indexing a relation between reliability and economic efficiency, the reliability economic efficiency index value calculation unit using the calculated reliability economic efficiency index value as reliability economic efficiency index value data; and
a disaster countermeasure decision unit that decides a disaster countermeasure by use of the reliability economic efficiency index value data, the disaster countermeasure decision unit using the decided disaster countermeasure as disaster countermeasure decision result data;
wherein the electric power system planning operation device outputs a control signal that controls operation of power supplies in the electric power system based on the disaster countermeasure.

2. The electric power system planning operation device according to claim 1, further comprising:
a display unit for displaying any one or more of the disaster information selection result data, the disaster countermeasure candidate calculation result data, the reliability economic efficiency index value data, and the disaster countermeasure decision result data.

3. The electric power system planning operation device according to claim 1, wherein
the disaster information data includes a damage facility and damage content by any one or more of an earthquake, a typhoon, a tsunami, a fire, a lightning strike, and a snowfall, and a damage occurrence probability.

4. The electric power system planning operation device according to claim 1, wherein
the system maintenance countermeasure candidate data includes a system maintenance countermeasure and an extension cost thereof for any one or more of transmission line extension, substation extension, phase modifying facility extension, high voltage direct current extension, synchronous phase modifier extension, static var compensator extension, self-excited static var compensator extension, static var generator extension, static synchronous compensator extension, and phase shifter extension.

5. The electric power system planning operation device according to claim 4, wherein
the disaster countermeasure candidate calculation result data includes any one or more of extension content for the system maintenance countermeasure candidate data and operation change content for the system operation countermeasure.

6. The electric power system planning operation device according to claim 5, wherein
the reliability economic efficiency index value data includes a calculation result of a countermeasure cost for the disaster information data and the disaster countermeasure candidate, a calculation result of a damage cost expectation value, and a calculation result of the reliability economic efficiency index value data.

7. The electric power system planning operation device according to claim 6, wherein
the disaster countermeasure decision result data includes a calculation result of the reliability economic efficiency index value for the disaster countermeasure candidate and the disaster information data and a selection result as a disaster countermeasure.

8. The electric power system planning operation device according to claim 1, wherein
the system operation countermeasure candidate data includes a system operation countermeasure and an operation cost thereof for any one or more of changing the output of a power plant, starting or stopping the power plant, changing a substation tap, installing or opening a phase modifying facility, and installing or opening a transmission line.

9. The electric power system planning operation device according to claim 1, wherein
the damage cost data includes any one or more of a power failure cost for each substation, a power failure cost for each customer, and a power failure cost for each customer type.

10. The electric power system planning operation device according to claim 1, wherein
the reliability economic efficiency index data includes a countermeasure cost, a damage cost expectation value, and weight coefficients thereof.

11. An electric power system planning operation system, wherein
the electric power system planning operation device according to claim 1 is linked with any one or more of a central power feed command system, a system planning system, a system stabilization system, a basic power feed command system, a system power feed command system, and a market management system, and
the disaster countermeasure decision result data obtained by the electric power system planning operation device is transmitted to the linked system.

12. The electric power system planning operation system according to claim 11, wherein
the electric power system planning operation device is an internal device of any one of a central power feed command system, a system planning system, a system stabilization system, a basic power feed command system, a system power feed command system, and a market management system.

13. An electric power system planning operation method against occurrence of a disaster, the electric power system planning operation method comprising:
selecting disaster information data of a disaster type to be handled and using the selected disaster information data as disaster information selection result data, from disaster information data for each disaster type;
calculating a disaster countermeasure candidate by use of the disaster information selection result data, system maintenance countermeasure candidate data that is information about performing maintenance of a system facility in preparation for a disaster, and system operation countermeasure candidate data that is information about defining a system operation countermeasure in preparation for a disaster, and using the calculated disaster countermeasure candidate as disaster countermeasure candidate calculation result data;
calculating a reliability economic efficiency index value for the disaster countermeasure candidate calculation result by use of the disaster countermeasure candidate calculation result data, system data that is information about the configuration of an electric power system, damage cost data that is information about an amount of damage to the electric power system at a time of an assumed disaster type, and reliability economic efficiency index data that is information indexing a relation between reliability and economic efficiency and using the calculated reliability economic efficiency index value as reliability economic efficiency index value data; and
deciding a disaster countermeasure by use of the reliability economic efficiency index value data; and
outputting a control signal that controls operation of power supplies in the electric power system based on the disaster countermeasure.

14. The electric power system planning operation method according to claim 13, wherein
the disaster information data includes a damage facility and damage content by any one or more of an earthquake, a typhoon, a tsunami, a fire, a lightning strike, and a snowfall, and a damage occurrence probability.

15. The electric power system planning operation method according to claim 13, wherein
the system maintenance countermeasure candidate data includes a system maintenance countermeasure and an extension cost thereof for any one or more of transmission line extension, substation extension, phase modifying facility extension, high voltage direct current extension, synchronous phase modifier extension, static var compensator extension, self-excited static var compensator extension, static var generator extension, static synchronous compensator extension, and phase shifter extension.

16. The electric power system planning operation method according to claim 13, wherein
the system operation countermeasure candidate data includes a system operation countermeasure and an operation cost thereof for any one or more of changing the output of a power plant, starting or stopping the power plant, changing a substation tap, installing or opening a phase modifying facility, and installing or opening a transmission line.

17. The electric power system planning operation method according to claim 16, wherein
the disaster countermeasure candidate calculation result data includes any one or more of extension content for the system maintenance countermeasure candidate data and operation change content for the system operation countermeasure.

18. The electric power system planning operation method according to claim 17, wherein
the reliability economic efficiency index value data includes a calculation result of a countermeasure cost for the disaster information data and the disaster countermeasure candidate calculation result data, a calculation result of a damage cost expectation value, and a calculation result of the reliability economic efficiency index value.

19. The electric power system planning operation method according to claim 18, wherein
a calculation result of the reliability economic efficiency index value for the disaster countermeasure candidate calculation result data and the disaster information data and a selection result as a disaster countermeasure are included.

20. The electric power system planning operation method according to claim 13, wherein
the damage cost data includes any one or more of a power failure cost for each substation, a power failure cost for each customer, and a power failure cost for each customer type.

21. The electric power system planning operation method according to claim 13, wherein
the reliability economic efficiency index data includes a countermeasure cost, a damage cost expectation value, and weight coefficients thereof.

* * * * *